US009695743B2

(12) United States Patent
Luetzow et al.

(10) Patent No.: US 9,695,743 B2
(45) Date of Patent: Jul. 4, 2017

(54) DEVICE FOR DRIVING AN ANCILLARY UNIT OF AN INTERNAL COMBUSTION ENGINE

(71) Applicant: BorgWarner Inc., Auburn Hills, MI (US)

(72) Inventors: Volker Luetzow, Reinsdorf (DE); Rico Martin, Krumhermersdorf (DE)

(73) Assignee: BorgWarner Inc., Auburn Hills, MI (US)

( * ) Notice: Subject to any disclaimer, the term of this patent is extended or adjusted under 35 U.S.C. 154(b) by 277 days.

(21) Appl. No.: 14/441,525

(22) PCT Filed: Nov. 5, 2013

(86) PCT No.: PCT/DE2013/000659
§ 371 (c)(1),
(2) Date: Jun. 24, 2015

(87) PCT Pub. No.: WO2014/071911
PCT Pub. Date: May 15, 2014

(65) Prior Publication Data
US 2015/0285137 A1 Oct. 8, 2015

(30) Foreign Application Priority Data
Nov. 8, 2012 (DE) .......................... 10 2012 022 195

(51) Int. Cl.
*F16H 37/02* (2006.01)
*F04B 17/02* (2006.01)
(Continued)

(52) U.S. Cl.
CPC ............... *F02B 67/04* (2013.01); *F01P 5/04* (2013.01); *F01P 5/12* (2013.01); *F02B 67/00* (2013.01);
(Continued)

(58) Field of Classification Search
CPC ... F16H 2061/0433; F04B 17/02; F04B 17/03
(Continued)

(56) References Cited

U.S. PATENT DOCUMENTS 5,360,319 A * 11/1994 Swain ................ F04B 39/0094
417/223
6,056,518 A 5/2000 Allen et al.
(Continued)

FOREIGN PATENT DOCUMENTS

AT 506829 A1 12/2009
CA 2402681 A1 3/2003
(Continued)

OTHER PUBLICATIONS

Dr. Philip Keller, et al., „Hybrid Coolant Pump with Electric and Mechanical Drive, Engine Technology Thermal Management, ATZ autotechnology, vol. 10, Jun. 2010, pp. 52-56.

*Primary Examiner* — Ha D Ho
(74) *Attorney, Agent, or Firm* — Harness, Dickey & Pierce, P.L.C.

(57) ABSTRACT

A device for driving an ancillary unit of an internal combustion engine includes the ancillary unit having a mechanical drive, joined to a first coupling section, and an electric drive having a rotor and a stator with windings. The rotor is joined to a second coupling section and non-rotatably to a shaft. The shaft is joined to a component of the ancillary unit to be driven. The rotor is movable axially along a lengthwise extension of the shaft and axially with respect to the shaft. The first and second coupling sections are movable relative to each other by means of the axial movement of the rotor so as to either join together or separate the mechanical drive and the rotor, the rotor being movable axially along the
(Continued)

lengthwise extension of the shaft with respect to the shaft in such a way that an electric current flows through the windings.

10 Claims, 3 Drawing Sheets

(51) Int. Cl.
    *F02B 67/04*     (2006.01)
    *F01P 5/12*     (2006.01)
    *F04D 13/02*     (2006.01)
    *F04D 13/06*     (2006.01)
    *F01P 5/04*     (2006.01)
    *F02B 67/00*     (2006.01)
    *F02B 67/08*     (2006.01)
    *F16D 27/14*     (2006.01)
    *H02K 1/24*     (2006.01)
    *H02K 7/00*     (2006.01)
    *H02K 7/10*     (2006.01)

(52) U.S. Cl.
    CPC ............ *F02B 67/08* (2013.01); *F04D 13/022* (2013.01); *F04D 13/06* (2013.01); *F16D 27/14* (2013.01); *H02K 1/246* (2013.01); *H02K 7/003* (2013.01); *H02K 7/10* (2013.01); *F01P 2005/046* (2013.01); *F01P 2050/24* (2013.01); *Y10T 74/19051* (2015.01)

(58) Field of Classification Search
    USPC ............................... 74/665 A, 665 B; 417/364
    See application file for complete search history.

(56) References Cited

U.S. PATENT DOCUMENTS

| | | | |
|---|---|---|---|
| 6,375,436 | B1 | 4/2002 | Irie et al. |
| 6,614,142 | B1 | 9/2003 | Bonnieman et al. |
| 7,494,439 | B2 | 2/2009 | Pashnik et al. |
| 2003/0053916 | A1 | 3/2003 | Terauchi |
| 2004/0013547 | A1 | 1/2004 | Allen |
| 2004/0165995 | A1 | 8/2004 | Suzuki et al. |
| 2004/0265143 | A1* | 12/2004 | Kawahara ........... F04C 18/0238 417/374 |
| 2005/0196297 | A1* | 9/2005 | Baumgartner ............ F01P 5/12 417/364 |
| 2005/0271534 | A1* | 12/2005 | Yokoyama .......... F04C 18/0215 418/55.6 |
| 2006/0057012 | A1* | 3/2006 | Park .................... F04C 18/0215 418/55.6 |
| 2006/0192440 | A1 | 8/2006 | Tunze et al. |
| 2007/0071617 | A1 | 3/2007 | Orue |
| 2011/0123365 | A1 | 5/2011 | Buchholz et al. |

FOREIGN PATENT DOCUMENTS

| | | |
|---|---|---|
| DE | 1019749 B | 11/1957 |
| DE | 19722336 A1 | 12/1997 |
| DE | 19628576 A1 | 1/1998 |
| DE | 10023508 A1 | 11/2001 |
| DE | 19983460 T1 | 1/2002 |
| DE | 10128059 C1 | 11/2002 |
| DE | 60000895 T2 | 9/2003 |
| DE | 10214637 A | 10/2003 |
| DE | 60219254 T2 | 7/2007 |
| DE | 60312533 T2 | 1/2008 |
| DE | 112009000861 T5 | 4/2011 |
| EP | 1045144 A1 | 10/2000 |
| JP | 2000130323 A | 5/2000 |
| JP | 2003161257 A | 6/2003 |
| WO | WO 2006125565 A1 | 11/2006 |

\* cited by examiner

DEVICE FOR DRIVING AN ANCILLARY UNIT OF AN INTERNAL COMBUSTION ENGINE

CROSS-REFERENCE TO PRIOR APPLICATION

This application is a U.S. National Stage Application under 35 U.S.C. §371 of International Application No. PCT/DE2013/000659 filed on Nov. 5, 2013 and claims benefit to German Patent Application No. 10 2012 022 195.9 filed on Nov. 8, 2012. The International Application was published in German on May 15, 2014 as WO 2014/071911 A1 under PCT Article 21(2).

FIELD

The present invention relates to a device for driving an ancillary unit of an internal combustion engine.

BACKGROUND

As is generally known, an objective within the scope of the development of internal combustion engines is to lower their fuel consumption. For this purpose, when it comes to the drive of motor vehicles, a so-called hybrid drive, for example, is employed, which comprises an internal combustion engine as well as an electric motor, whereby the internal combustion engine drives the electric motor that functions as a generator, so that an electric storage unit can be charged. Moreover, so-called start-stop systems are used, with which the internal combustion engine is switched off when the vehicle is standing still. In these two configurations, which are given by way of an example, a scenario can occur in which the internal combustion engine is at first operating at a high load and then abruptly turned off, for example, when the electric storage unit of a hybrid drive is sufficiently charged or, in the case of a start-stop system, when the vehicle is braked from full speed all the way to a standstill. In actual practice, aside from the mechanically driven coolant pumps, there are also electrically driven coolant pumps for such situations, so that the coolant is kept circulating and an impermissible rise in the temperature of the coolant is prevented, which would occur due to the considerable heat capacity of the housing of the internal combustion engine. A drawback is that two units are needed here. It is likewise a disadvantage that the purely mechanically driven ancillary units of an internal combustion engine such as, for instance, a coolant pump, always increase the fuel consumption of the internal combustion engine since they convey coolant even when this is not necessary, for example, at the time of a cold start of the internal combustion engine.

In order to avoid these inadequacies, the German translation of a European patent specification, DE112009000861 T5, for example, discloses a coolant pump having the features described as follows. This coolant pump has an impeller that is arranged on an impeller shaft. This coolant pump has a drive device for the impeller, whereby the drive device has a mechanical drive and an electric motor drive. In this context, the pump impeller shaft is divided into a driving section and a driven section whereby a coupling that can be opened and closed is installed between the driving section and the driven section. Several switching states can be established by means of this coolant pump. For example, the coupling can be closed so that the coolant pump is driven purely mechanically. Moreover, the mechanical drive can be interrupted by opening the coupling, so that, when the electric motor is not being operated by the engine, no coolant is being conveyed, thus, for instance, shortening the warm-up phase of the internal combustion engine. Moreover, when the coupling is opened, only the electric motor can be operated so that, in the case of a sudden standstill, coolant can still be conveyed, as described above. A disadvantage of the ancillary unit according to DE112009000861 T5 is that the coupling installed between the driving section and the driven section requires an additional actuator such as, for example, an electromagnet with a coil, a measure that not only calls for additional components but also has a detrimental effect on the installation size of this ancillary unit.

SUMMARY

In an embodiment, the present invention provides a device for driving an ancillary unit of an internal combustion engine. The ancillary unit has a mechanical drive and an electric drive. The mechanical drive is joined to a first coupling section. The electric drive has a rotor and a stator that form an electric motor. The stator has windings. The rotor is joined to a second coupling section and non-rotatably joined to a shaft. The shaft is joined to at least one component of the ancillary unit that is to be driven. The rotor is movable axially along a lengthwise extension of the shaft and axially with respect to the shaft. The first coupling section and the second coupling section are movable relative to each other by means of the axial movement of the rotor so as to either join together or separate the mechanical drive and the rotor, the rotor being movable axially along the lengthwise extension of the shaft with respect to the shaft in such a way that an electric current flows through the windings.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
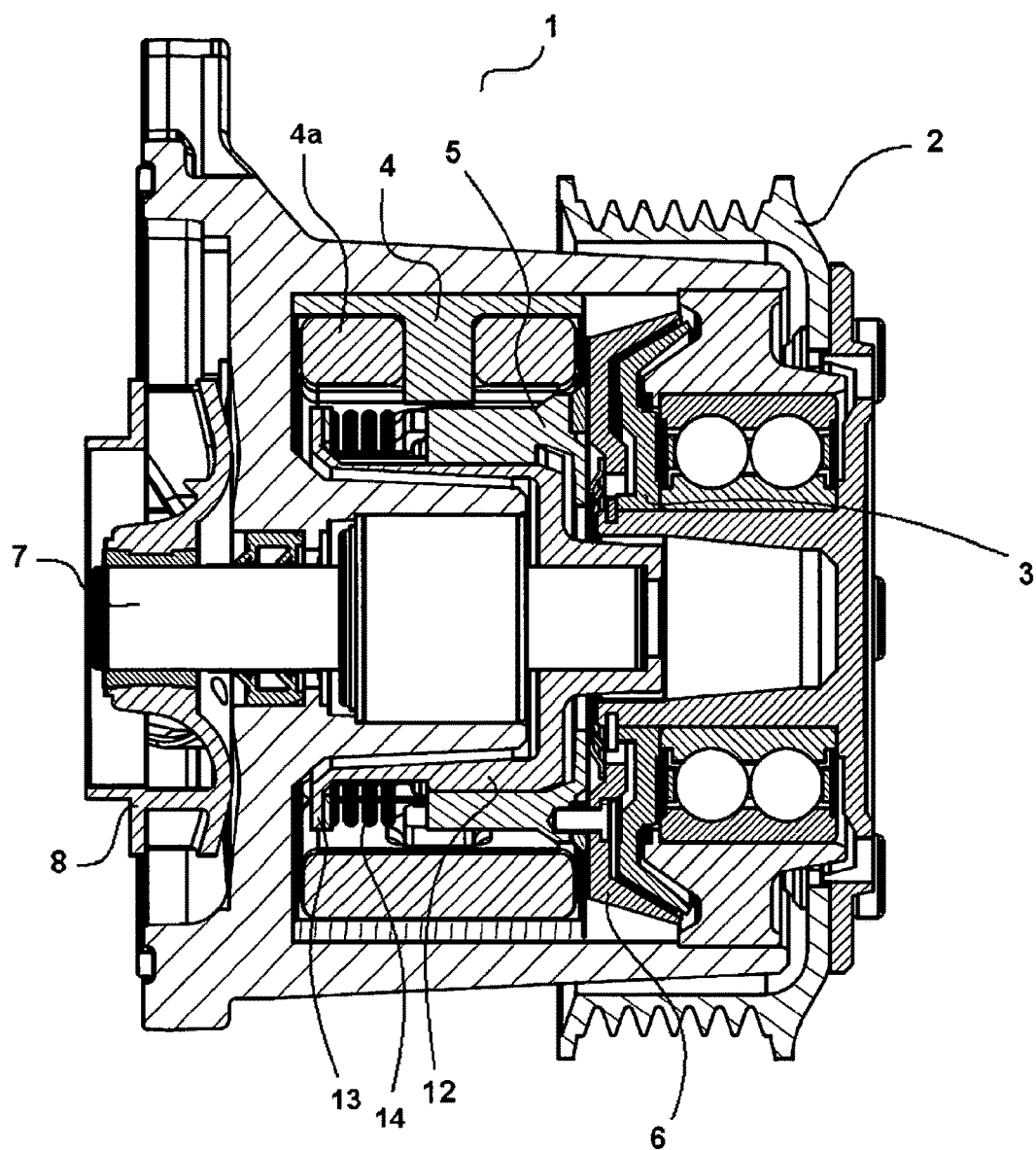
FIG. 1 shows a first sectional view of an embodiment of the present invention.

In an embodiment, the present invention provides a drive for an ancillary unit, whereby the ancillary unit has a mechanical drive and an electric drive as well as a coupling that can be opened and closed and that is installed between these drives, whereby the ancillary unit is as compact as possible, or in other words, it has only a few components.

According to an embodiment, a device for driving an ancillary unit of an internal combustion engine, comprises the following features:

the ancillary unit comprises a mechanical drive and an electric drive, the mechanical drive is joined to a first coupling section, the electric drive comprises a rotor and a stator that form an electric motor, the stator has windings through which an electric current flows or does not flow, the rotor of the electric motor is joined to a second coupling section, the rotor is non-rotatably joined to a shaft, the shaft is joined to at least one component of the ancillary unit that is to be driven, the rotor can be moved axially along the lengthwise extension of the shaft as well as axially with respect to the shaft, the first coupling section and the second coupling section are moved relative to each other by means of the axial movement of the rotor, so that the mechanical drive and the rotor are either joined together or separated from each other, as a result, the rotor is moved axially along the lengthwise extension of the shaft with respect to the shaft in such a way that an electric current flows through the windings.

Since the rotor is moved axially with respect to the shaft due to the effects of the magnetic field of the stator windings through which an electric current flows, the installation size of the ancillary unit is advantageously relatively small according to the invention. Furthermore, there is no need for additional components in order to move the first coupling section and the second coupling section relative to each other since the cooperation of the components of the electric drive, namely, the rotor and the windings, is utilized for this purpose according to an embodiment of the invention. The mechanical drive can be, for instance, a pulley, a sprocket, a gear wheel or else a direct shaft coupling. The electric drive preferably constitutes an electric motor that functions according to the principle of a reluctance motor. The ancillary unit can be, for example, a coolant pump, an air-conditioning compressor, a power steering pump or a supercharger, that is to say, the device according to an embodiment of the invention is by no means restricted to a specific application case. In other words, the component of the ancillary unit that is to be driven can be, for example, a pump impeller, the rotor of a vane pump, a compressor wheel, a gear wheel or else a swash plate. Preferably, the rotational movement of the rotor or the rotational movement of the shaft is detected by means of a rotational speed sensor, and this is then available for regulation and/or diagnostics. Preferably, this signal is detected without the use of a sensor, as a function of characteristic values of the electric drive, for instance, current or voltage curves of the windings. Moreover, the axial movement of the rotor can be detected by means of a position sensor and it is then available for regulation and/or diagnostics. Preferably, also this signal is detected without the use of a sensor, as a function of characteristic values of the electric drive, for instance, current or voltage curves of the windings.

Figure 2:
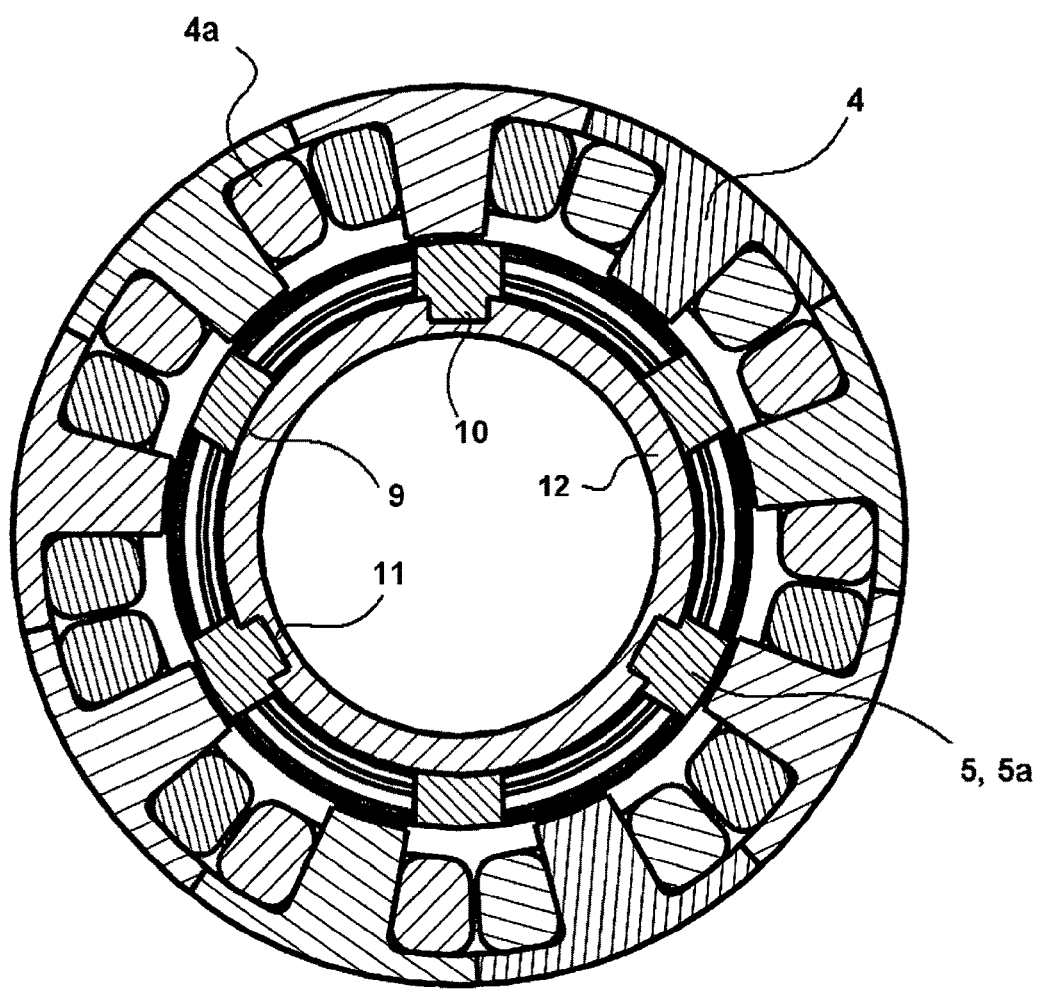
FIG. 2 shows a second sectional view of an embodiment of the present invention.

An ancillary unit of an internal combustion engine can be, for example, a coolant pump 1, such as shown in FIG. 1. The coolant pump 1 comprises a mechanical drive 2 that is configured as a pulley. The pulley 2 is non-rotatably joined to a first coupling section 3. The coolant pump 1 also comprises a stator 4 and a rotor 5 for an electric drive, that is to say, the stator 4 and the rotor 5 form an electric motor. The rotor 5 is non-rotatably joined to a second coupling section 6. The rotor 5 is joined to a shaft 7. The shaft 7 is joined to a pump impeller 8. In particular, the rotor 5 is arranged coaxially to the shaft 7. The rotor 5 can be axially moved along the lengthwise extension of the shaft 7 in the direction of the pump impeller 8, although it is non-rotatably joined to the shaft 7. Consequently, as is shown in FIG. 2, the rotor 5 is non-rotatably joined to the shaft 7 as well as axially movable with respect to the shaft 7 in that the inner circumference 9 of the rotor 5 has elevations 10 that engage with grooves 11 that are arranged directly on the outer circumference of the shaft 7, a situation, however, that is not shown in FIG. 1 or in FIG. 2. Rather, according to FIGS. 1 and 2, the grooves 11 are arranged on the outer circumference of an intermediate element 12. As can be seen in FIG. 1, the intermediate element 12 is arranged coaxially to the shaft 7 and joined non-rotatably to the shaft 7. The intermediate element 12 has a collar 13 which extends radially and on which one end of a compression spring 14 with a cylindrical cross section is supported, so that the rotor 5, which cooperates with the other end of the compression spring 14, is pushed or forced along the lengthwise extension of the shaft 7 axially in the direction of the first coupling section 3, so that the first coupling section 3 and the second coupling section 6 form a positive or non-positive connection, that is to say, the coupling is closed, and the pump impeller 8 is mechanically driven via the pulley 2. This prevents a total failure of the coolant pump 1 since, owing to the action of the compression spring 14, the coolant pump 1 is continuously driven mechanically, something which is not optimal from an efficiency standpoint but which ensures a constant flow of coolant.

According to an embodiment of the invention, the opening of the coupling, that is to say, the separation of the first coupling section 3 and the second coupling section 6 from each other, takes place in that an electric current flows through the windings or magnetic coils 4a of the stator 4, building up a magnetic field, and the rotor 5, which comprises a magnetic material or is made of such a material such as, for example, a soft-magnetic material, is moved against the action of force of the compression spring 14 and axially along the lengthwise extension of the shaft 7 in the direction of the pump impeller 8. In other words, as is shown in the side view in FIG. 2, the rotor 5 comprises prominent poles or legs 5a that cooperate with windings 4a. In particular, an electric current first flows through the windings 4a or else they are activated so that a static magnetic field is formed in such a way that the rotor 5 is not made to rotate, that is to say, no magnetic field that rotates around the longitudinal axis of the shaft 7 is formed but, in fact, the rotor 5 is moved against the action of force of the compression spring 14 and axially along the lengthwise extension of the shaft 7 in the direction of the pump impeller 8, so that the first coupling section 3 and the second coupling section 6 are separated from each other, that is to say, the coupling is opened. In this manner, the pump impeller 8 is not mechanically driven by means of the pulley 2 and the pump impeller 8 is not electrically driven by the electric motor comprising the stator 4 nor by the windings 4a and the rotor 5.

Such a deactivation of the coolant pump 1 can be advantageous, for instance, when the internal combustion engine is warming up. Consequently, in order to deactivate the coolant pump 1, all that is necessary is a certain amount of electric energy, a process in which no other components are needed since the windings 4a and the rotor 5 are both already present anyway and, according to an embodiment of the invention, they cooperate as a coupling actuation or actuator. In order to use the rotor 5, as described above, to separate the first coupling section 3 and the second coupling section 6 from each other, an electric current can flow through all of the windings 4a or else through only some of the windings 4a. Of course, according to an embodiment of the invention, if the coolant pump 1 is operated purely electrically, an electric current can flow through the windings 4a in such a way that a magnetic field that rotates around the longitudinal axis or rotational axis of the shaft 7 is formed and, on the one hand, the rotor 5 is moved axially along the lengthwise extension of the shaft 7 in the direction of the pump impeller 8 and against the action of force of the compression spring 14, so that the first coupling section 3 and the second coupling section 6 are separated from each other, that is to say, the coupling is opened, and, on the other hand, the rotor 5 is magnetically carried along by the rotating field.

Preferably, the electric motor comprising the rotor 5 and the windings 4a or the stator 4 is configured as a reluctance motor. As already explained above, the rotor 5 here does not comprise any magnets or magnetic coils but rather is at least made of soft-magnetic material. As shown in FIG. 2, the stator 4 comprises nine windings 4a and the rotor 5 comprises six prominent poles or legs 5a. These windings 4a and poles or legs 5a work according to an embodiment of the invention, for example, along the lines of a switched reluctance motor. In other words, starting from a closed coupling, that is to say, when the first coupling section 3 and the second coupling section 6 are joined to each other by the compression spring 14 and the pump impeller 8 is being driven mechanically by means of the pulley 2, then at least some of the nine windings or magnetic coils 4a are switched on or a voltage is applied to them, so that an electric current is flowing. Since the system consisting of the windings or magnetic coils 4a and the poles or legs 5a strives towards a minimum reluctance, the rotor 5 is moved axially along the lengthwise extension of the shaft 7 in the direction of the pump impeller 8 and against the action of the compression spring 14, so that the first coupling section 3 and the second coupling section 6 are separated from each other, that is to say, the coupling is opened, whereby, over the further course, an electric current alternately flows through the windings or magnetic coils 4a, so that the windings or magnetic coils 4a through which a current flows electromagnetically attract the closest pole or leg 5a of the rotor 5, a process in which a current no longer flows through the windings or magnetic coils 4a when the poles or legs 5a of the rotor 5 are across from the windings or magnetic coils 4a that attract them.

According to an embodiment of the invention, on the one hand, due to the electromagnetic attraction of the rotor 5 in the direction of the pump impeller 8, the rotor 5 is moved axially on the shaft 7 against the action of the compression spring 14, a process in which the coupling is opened, and, on the other hand, the rotor 5 is made to rotate due to the alternating flowing of current through the windings or magnetic coils 4a, thus causing the coolant to flow. The electric motor can also be configured as a synchronous reluctance motor, or else it can be configured in any desired manner such that, on the one hand, the inventive effect of the actuation of the coupling is used in order to separate the pump impeller 8 from the pulley 2 and, on the other hand, the resultant operation of the electric motor consisting of the stator 4 and the rotor 5 is used to drive the pump impeller 8. As an alternative, it is also possible to use a disk spring instead of the compression spring 14. It is also conceivable to use a tension spring that is positioned in such a way that the rotor 5 is pulled axially along the lengthwise extension of the shaft 7 in the direction of the first coupling section 3.

Figure 3:
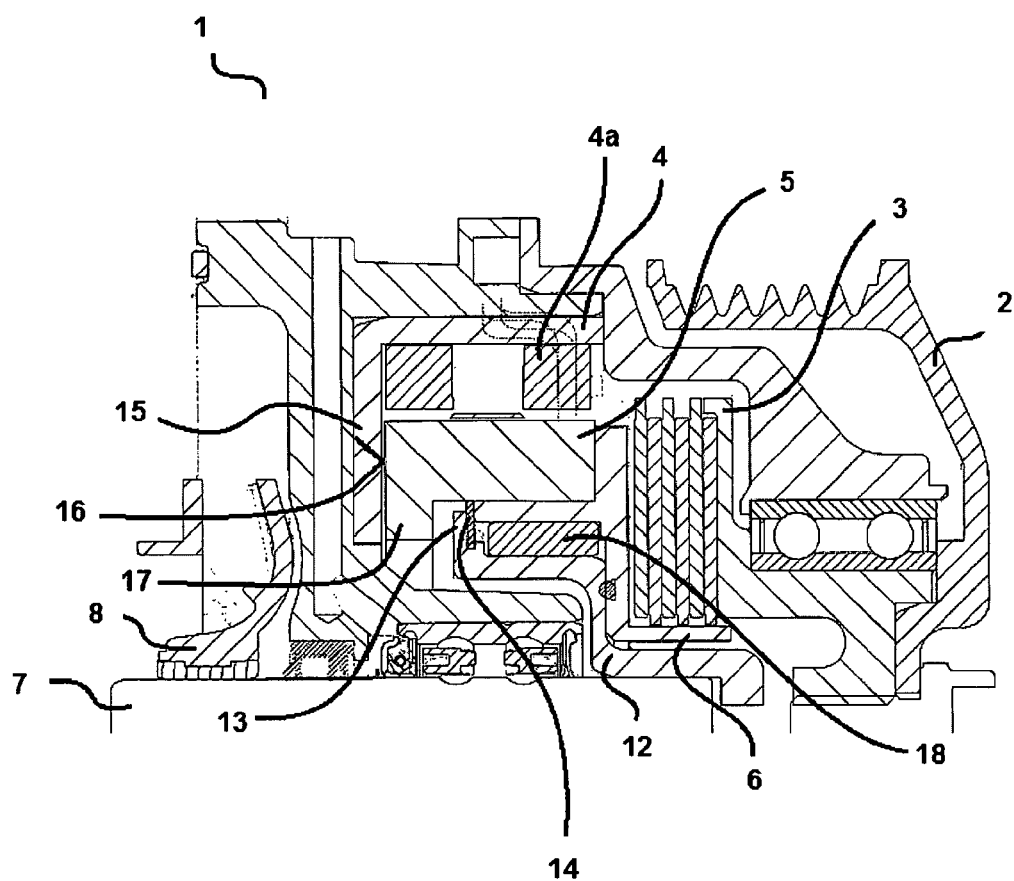
FIG. 3 shows a third sectional view of an embodiment of the present invention.

As is shown in FIG. 3, according to an embodiment of the invention, the stator 4 can have a radially extending collar 15 so that the stator 4 surrounds the circumference of the rotor 5 as well as an end face 16 of the rotor 5. In this manner, the magnetic field is influenced in such a way that the movement of the rotor 5 with respect to the shaft 7 axially along the lengthwise extension of the shaft 7 is assisted when an electric current flows through the windings 4a of the stator 4. In other words, owing to this radial configuration of the stator 4, radially and axially active field lines are formed, as a result of which the movement of the rotor 5 with respect to the shaft 7 axially along the lengthwise extension of the shaft 7 is assisted. According to an embodiment of the invention, this effect can be enhanced in that the rotor 5 also has a radially extending collar 17 which is arranged on the end face 16 of the rotor 5 facing the radially extending collar 15 of the stator 4.

In this context, FIG. 3 shows another conceivable embodiment of the present invention in which the compression spring 14 is a disk spring. Moreover, according to FIG. 3, the rotor 5 is thus non-rotatably joined to the shaft 7 and can be axially moved with respect to the shaft 7 in that the inner circumference of the second coupling section 6 on which the rotor 5 is arranged non-rotatably and so that it cannot be moved axially has grooves, and the outer circumference of the intermediate element 12, which is arranged coaxially to the shaft 7 and joined non-rotatably to the shaft 7, has grooves, whereby roller elements 18 are arranged in the appertaining grooves between the rotor 5 and the intermediate element 12.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A device for driving an ancillary unit of an internal combustion engine, the device comprising:

the ancillary unit comprising a mechanical drive and an electric drive, the mechanical drive being joined to a first coupling section, the electric drive having a rotor and a stator that form an electric motor, the stator having windings, the rotor being joined to a second coupling section and non-rotatably joined to a shaft, the shaft being joined to at least one component of the ancillary unit that is to be driven, wherein the rotor is movable axially along a lengthwise extension of the shaft and axially with respect to the shaft, the first coupling section and the second coupling section being movable relative to each other by means of the axial movement of the rotor so as to either join together or separate the mechanical drive and the rotor, the rotor being movable axially along the lengthwise extension of the shaft with respect to the shaft in such a way that an electric current flows through the windings.

2. The device according to claim 1, wherein the ancillary unit is a coolant pump, an air-conditioning compressor, a power steering pump, a supercharging pump, a supercharging compressor, a blower or a fan.

3. The device according to claim 1, wherein the mechanical drive is a pulley, a sprocket, a gear wheel or a direct shaft coupling.

4. The device according to claim 1, wherein the electric drive is an electric motor that functions as a reluctance motor.

5. The device according to claim 1, wherein the rotor is arranged coaxially to the shaft.

6. The device according to claim 5, wherein the rotor is non-rotatably joined to the shaft and axially movable with respect to the shaft in that an inner circumference of the rotor has elevations that engage with grooves that are arranged directly on an outer circumference of the shaft or on an outer circumference of an intermediate element arranged coaxially to the shaft and joined non-rotatably to the shaft.

7. The device according to claim 6, wherein the intermediate element is present and the grooves are on the intermediate element, the at least one component of the ancillary unit being a pump impeller and the mechanical drive being a pulley, the intermediate element having a collar which extends radially, a first end of a compression spring being supported on the collar, so that the rotor, which cooperates with a second opposite end of the compression spring, is pushed along the lengthwise extension of the shaft axially in a direction of the first coupling section, so that the first coupling section and the second coupling section form a positive or non-positive connection, and the pump impeller is mechanically driven via the pulley.

8. The device according to claim 1, wherein the rotor comprises a magnetic material.

9. The device according to claim 1, wherein the stator has a radially extending collar such that the stator surrounds a circumference of the rotor as well as an end face of the rotor.

10. The device according to claim 9, wherein the rotor has a radially extending collar which is arranged on the end face of the rotor facing the radially extending collar of the stator.

* * * * *